UNITED STATES PATENT OFFICE.

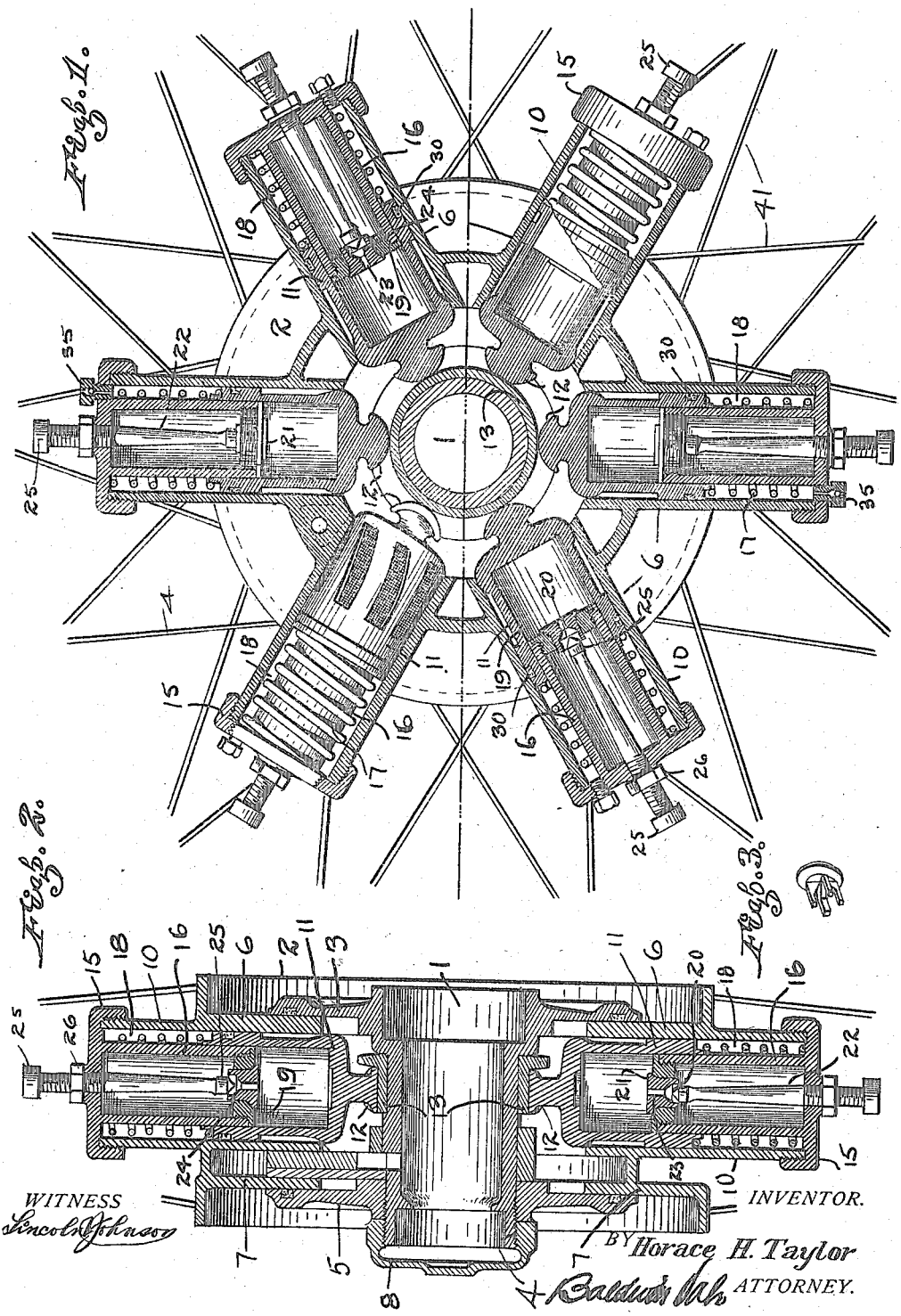

HORACE H. TAYLOR, OF OAKLAND, CALIFORNIA, ASSIGNOR OF ONE-THIRD TO FRANK J. MAYHEW, OF SAN FRANCISCO, CALIFORNIA.

RESILIENT WHEEL.

1,271,100.  Specification of Letters Patent.  Patented July 2, 1918.

Continuation of application filed July 24, 1916, Serial No. 110,921. This application filed July 30, 1917. Serial No. 183,480.

*To all whom it may concern:*

Be it known that I, HORACE H. TAYLOR, a citizen of the United States, residing in the city of Oakland, county of Alameda and State of California, have invented a new and useful Improvement in Resilient Wheels; and I do hereby declare the following to be a full, clear, concise, and exact description of the same.

This application is filed in accordance with the decision of the First Assistant Commissioner of Patents in *ex parte* Horace H. Taylor and Leonard A. Moberry declaring invalid the joint application of Horace H. Taylor and Leonard A. Moberry, for resilient wheels, filed July 24, 1916, Serial No. 110,921.

This application is filed as a substitute for and as a continuance of said joint application of Horace H. Taylor and Leonard A. Moberry and said joint application of Horace H. Taylor and Leonard A. Moberry is hereby abandoned.

My invention is an improved resilient wheel operable without pneumatic tires.

More particularly my invention includes a plurality of cylinders mounted on the wheel and acting upon a fluid in such manner as to maintain the rim resilient with relation to the hub of the wheel.

In this specification and the annexed drawing I illustrate my invention in the form which I consider the best, but I do not limit the invention to such form as it may be embodied in other forms, and it is to be understood that in and by the claims following the description herein I intend to cover the invention in whatever form it may be embodied.

Referring to the annexed drawing which forms part of this specification and the following claims:

Figure 1 is a section of the inner portion of my improved wheel taken transversely of its axis.

Fig. 2 is a section of the inner portion of the wheel taken on its axis.

Fig. 3 is a perspective view of one of the piston valve members.

In the drawing 1 indicates an inner hub adapted to rotate around an axle (not shown) and 2 an outer hub surrounding the inner hub. The inner hub is formed with a rear annular flange 3 and an external thread 4 is cut in the periphery of the front end of said hub on which thread screws a nut 5. Internal rear and front annular flanges 6 and 7 are formed in the outer hub 2 which flanges fit between the hub flange 3 and the nut 5 in sliding engagement therewith, whereby the outer hub is maintained against axial displacement on the hub 1 and allowed to float transversely with relation to the axis of the inner hub. In the ideal relation of the two hubs their axes are coincident. A cap 8 screws on the thread 4 on the front end of the inner hub against the nut 5 and closes the front end of the inner hub and forms a lock nut preventing the nut 5 from working off the front end of the inner hub. The outer hub 2 is formed with a plurality of cylinders 10 extending radially from the center of the hub within which cylinders are reciprocatively mounted plunger-cylinders 11. On the heads at the inner ends of the plunger cylinders 11 are cams 12 for engaging a sleeve 13 surrounding the inner hub 1. The sleeve 13 is formed with an annular flange 14 which engages a flat side of the cams 12 and prevents axial turning of the plunger cylinders 11. Caps 15 screw on the outer ends of the hub cylinders, on which caps are formed inwardly extending hollow pistons 16 which extend into and are adapted to reciprocate in the plunger cylinders 11. The pistons 16 being of less diameter than the cylinders 6 provide annular spaces 18 between them and the cylinders 6 in which spaces springs 17 are coiled around the pistons, the ends of which springs bear respectively against the caps 15 and the outer ends of the plunger cylinders 11 and maintain the plunger-cylinders 11 at the limit of their innermost position with the cams 12 in engagement with the sleeve 13. The inner end of the hollow pistons 16 are closed by heads 19 which screw into said end of the piston. Valves 20 control communication between the plunger-cylinders 11 and the interior of pistons 16. Said valves each include a valve member 21 extending through and securely fitted within each piston head and a threaded valve controlling member 22, the stem of which is threaded and extends through and engages with a threaded opening in each of the hub cylinder caps 15. Each valve member 21 has a port 23 extending therethrough and is formed with a conical seat 24 to receive a conical head 25 on the inner extremity of the valve controlling member 22 for closing the valves and shutting off communication between the interior of cylinders 11 and pistons 16. The outer end of the valve controlling members 22 have thumb wheels 25 fixed thereon, whereby said members are turned, and moved axially by their threaded engagement with the cup openings, for opening and closing the valves 20. Lock nuts 26 screw on the threaded valve stems against the outer faces of the hub cylinder caps and lock the valves 20 open the desired degree. The cylinders 11 and hollow pistons 16 are suitably charged with any suitable fluid as for example oil. Packing rings 30 are provided on the exterior of the plunger cylinders 11 in engagement with the interior of the outer hub cylinders 6 for preventing any oil from leaking past the plunger-cylinders into the interior of the hub.

Air inlet valves 35 are provided in the hub-cylinder heads 15 for the admission of air into the spaces 18, which air is compressed by the plunger-cylinders 11 on their outward stroke and prevents oil from leaking out of the plunger-cylinders past the pistons 16, into the spaces 18.

The outer hub 2 is formed with a cylindrical member 40 to which the inner end of the spokes 41 of the wheel are attached, the outer end of which are attached to the rim of the wheel (not shown).

The operation of my invention is as follows:—

The pressure of the piston heads 19 on the oil in the cylinders 11 normally balances the outer hub and rim so that their axes coincides with the axis of the inner hub.

The valves 20 being properly adjusted to regulate the flow of liquid through their ports 23, as the wheel rotates over an uneven surface the shocks on the rim of the wheel are transmitted to the outer hub 2 through the spokes 41, which causes the lower pistons 16 to move inwardly within the lower cylinders 11, and force oil through the valve ports 23 from said cylinders 11 into said pistons 16 and thereby absorb the shocks on the wheel rim before reaching the inner hub 1, thus relieving the inner hub of such shocks.

As said lower pistons and cylinders rotate above the axis of the wheel and the succeeding pistons and cylinders take their position below the axis, the hub 2 and wheel rim are restored to axial alinement with the hub 1 by the resistance of the liquid in the approaching succeeding cylinders, while the preceding pistons above the axis are forced outward and the oil flows therefrom through the openings 23 back into the cylinders 11 above the axis, filling said cylinders so that the preceding cylinders and pistons will sustain the wheel rim and its hub 2 in axial alinement with the hub 1 when said cylinders and pistons again rotate below the axis of the wheel.

Having described my invention I claim as new and desire to secure by Letters Patent:

1. In a wheel, the combination of a hub, a movable hub connected to the spokes of the wheel, a circular series of cylinders carried by said movable hub, hollow pistons reciprocatively mounted in said cylinders, and having their inner ends closed, said cylinders and hollow pistons containing a fluid, springs pressing said cylinders toward the aforesaid hub, and means controlling communication between said cylinders and pistons.

2. In a wheel, the combination of an inner hub, an outer hub attached to the spokes of the wheel, a circular series of radiating cylinders carried by said outer hub, hollow pistons reciprocatively mounted within said cylinders and having their inner ends closed, said cylinders and hollow pistons containing a fluid, springs pressing said cylinders toward said inner hub, and means controlling communication between said cylinders and pistons.

3. In a wheel, the combination of an inner hub, an outer hub attached to the spokes of the wheel, a circular series of radiating cylinders carried by said outer hub, hollow pistons reciprocatively mounted within said cylinders, and having their inner ends closed, said cylinders and hollow pistons containing a fluid, springs pressing said cylinders toward said inner hub, and a valve for controlling communication between said cylinders and said pistons, and means for adjusting said valves to regulate the valve passage.

4. In a wheel, the combination of an inner hub, an outer hub attached to the spokes of the wheel, a circular series of radiating outer cylinders carried by said outer hub, caps secured on said cylinders, hollow pistons carried by said caps and extending within said outer cylinders and forming spaces between the outer cylinders and pistons the inner ends of said pistons being closed, plunger cylinders mounted to reciprocate in said outer cylinders within said spaces and upon said hollow pistons, said hollow pistons and said plunger-cylinders, containing a fluid, springs surrounding said pistons within said spaces and bearing against said caps and the outer ends of said plunger-cylinders toward said inner hub, and means controlling the flow of fluid from said plunger cylinders to said hollow pistons and vice versa.

5. In a wheel, an inner hub, an outer hub, attached to the spokes of the wheel, a plurality of cylinders carried by said outer hub, a plurality of hollow pistons reciprocatively mounted in said cylinders, means for pressing said cylinders toward said inner hub, said cylinders and said hollow pistons containing a fluid, the inner ends of said pistons being closed, and means controlling the passage of fluid from said cylinders into said hollow pistons and vice versa.

6. In a wheel, the combination of a hub, a second hub movable with relation to said first hub and connected to the spokes of the wheel, a circular series of cylinders carried by said movable hub, hollow pistons reciprocatively mounted in said cylinders and having their inner ends closed, said cylinders and hollow pistons containing a fluid, means for pressing said cylinders toward the aforesaid hub, and means controlling communication between said cylinders and hollow pistons.

7. In a wheel, the combination of a hub, a second hub movable with relation to said first hub and connected to the spokes of the wheel, a circular series of cylinders carried by said movable hub, hollow pistons reciprocatively mounted in said cylinders and having their inner ends closed, said cylinders and hollow pistons containing a fluid, means for pressing said cylinders toward the aforesaid hub, and means controlling communication between said cylinders and hollow pistons, and means for preventing leakage of fluid from said cylinders and hollow pistons.

8. In a wheel, the combination of an inner hub, an outer hub attached to the spokes of the wheel, a circular series of radiating cylinders carried by said outer hub, hollow pistons reciprocatively mounted within said cylinders and having their inner ends closed, said cylinders and hollow pistons containing a fluid, means for pressing said cylinders toward said inner hub, means controlling communication between said cylinders and pistons, and means for preventing leakage of fluid from said cylinders.

9. In a wheel, the combination of an inner hub, an outer hub attached to the spokes of the wheel, a series of radiating outer cylinders carried by said outer hub, hollow pistons carried within said outer cylinders, and forming spaces between the outer cylinders and pistons, the inner ends of said pistons being closed, plunger-cylinders mounted to reciprocate in said outer cylinders upon said pistons and within said spaces, said hollow pistons and plunger-cylinders containing a fluid, means for forcing said plunger-cylinders toward said inner hub, means controlling the flow of fluid from said plunger-cylinders to said hollow piston and vice versa, and an air inlet valve for admitting air into said spaces to be compressed therein by said plunger-cylinders.

In testimony whereof, I have hereunto set my hand at Oakland, California, this 1st day of June, 1917.

HORACE H. TAYLOR.

In presence of—
E. M. BAKEWELL,
EMILY E. HALL.

Copies of this patent may be obtained for five cents each, by addressing the "Commissioner of Patents, Washington, D. C."